Sept. 8, 1970   R. P. CLARK ET AL   3,527,615
THERMAL BATTERY HAVING PROTECTIVELY COATED CALCIUM ANODE TO
PREVENT ALLOY SHORTING
Filed May 14, 1969
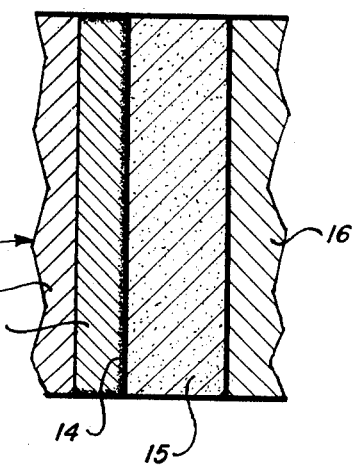
INVENTORS
Robert P. Clark
Kenneth R. Grothaus
BY
Attorney United States Patent Office 3,527,615
Patented Sept. 8, 1970

3,527,615
THERMAL BATTERY HAVING PROTECTIVELY COATED CALCIUM ANODE TO PREVENT ALLOY SHORTING
Robert P. Clark and Kenneth R. Grothaus, Albuquerque, N. Mex., assignors to the United States of America as represented by the United States Atomic Energy Commission
Filed May 14, 1969, Ser. No. 824,610
Int. Cl. H01m 23/00
U.S. Cl. 136—83                         3 Claims

ABSTRACT OF THE DISCLOSURE

A thermal battery including a plurality of electrochemical cells, each containing a fused electrolyte sandwiched between a calcium anode and any suitable cathode, the electrolyte consisting essentially of a lithium chloride-potassium chloride eutectic mixture which becomes conductive on melting and the anode being coated with a layer of a calcium-containing compound adapted to inhibit the formation of a lithium-calcium alloy at the anode surface in contact with the electrolyte.

BACKGROUND OF THE INVENTION

This invention is concerned with an improvement in thermal batteries of the type which employ one or more electrochemical cells each comprising a cathode and an anode separated by a fused electrolyte which, on melting, renders the device capable of delivering electrical energy. Thermal batteries of this type have heretofore commonly employed a lithium chloride-potassium chloride fused salt eutectic as the electrolyte and have incorporated a calcium anode. An example of this type of battery may be found in Pat. No. 3,425,872 to Levy.

Lithium salts are advantageous for use in thermal battery electrolytes for several reasons. In the first place, they melt at comparatively low temperatures and permit battery operation at lower temperatures than would be possible with many other electrolytes. Furthermore, lithium salts have a high ionic conductivity and low internal resistance, thereby permitting high current to be drawn from an electrochemical cell. However, at the operating temperature of a thermal battery (typically 400° to 625° C.), lithium chloride reacts with the calcium anode to yield free molten lithium according to the following reaction:

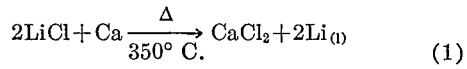

The molten lithium in turn combines with the calcium anode according to the following reaction:

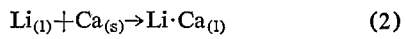

to form a molten calcium-lithium alloy at the interface between the anode and the electrolyte. The creation of this alloy might be avoided by selecting an anode material less active in the electromotive scale than lithium, such as magnesium. The result would be, however, that cell voltage output would be degraded.

The calcium-lithium alloy characteristically forms small globules which frequently create a conductive bridge between the anode and the cathode, causing either intermittent or permanent shorting of the cell involved. In a thermal battery composed of a plurality of cells, even the temporary shorting of one cell, i.e., noise, may instantaneously lower the output voltage below some preset threshold value, thus terminating the effective battery life. Noise is, in any event, an added current drain and therefore shortens battery life. Permanent shorting of a cell, of course, results in greater current drain on the remaining cells and, consequently, more rapid battery discharge to any given voltage level.

This alloy-induced shorting is one of the principle modes of failure in thermal batteries. Previous attempts to control the formation of this alloy have involved (1) electrolyte additives and (2) physical barriers to retain the flow of alloy. The disadvantages of these methods have been (1) reduction of cell voltage, (2) reduction of cell discharge life, and (3) poor reliability in the elimination of alloy shorting.

SUMMARY OF INVENTION

The object of this invention is to control calcium-lithium alloy shorting in thermal batteries using calcium anodes and electrolytes containing lithium chloride.

This object is achieved by forming a layer of a calcium-containing compound on the calcium anode surface whereby the formation of a lithium-calcium alloy at this surface is inhibited at the operating temperature of the battery.

The preferred process for preparing the calcium anode begins with the steps of immersing the anode at about 27° C. in a solution of glacial acetic acid in acetone whereby a double salt of calcium acetate and acetic acid is formed on the surface of the anode and drying the treated anode at about 27° C. for sufficient time to evaporate the excess acetone. At this point three options are available, depending on the expected conditions of assembly and the type of battery in which the anode will be employed: (a) the anode may be assembled in an electrochemical cell, (b) the anode may be heated prior to assembly at from 200° to 325° C. until the double salt is completely decomposed to calcium acetate, or (c) the anode may be heated further prior to assembly at from 350° to 625° C. until the calcium acetate is completely decomposed to calcium carbonate.

Upon assembly of the anode within an electrochemical cell and activation of the cell, the heat of operation will produce complete decomposition of the anode layer to calcium carbonate if either option (a) or (b) is selected. The final calcium carbonate layer on the anode surface dissolves at least slightly in the electrolyte to produce a high concentration of positive calcium ions at the interface between the anode and the electrolyte. The chemical and electrical operation of a cell constructed in accordance with this invention is independent of the particular heating option selected.

DESCRIPTION OF DRAWING

The attached sketch shows in cross section a portion of a typical electrochemical cell of a thermal battery in accordance with this invention.

DETAILED DESCRIPTION

The protectively coated anode to be described herein and the preferred process for preparing such anode are generally useful in any thermal battery in which a lithium chloride salt is employed in the electrolyte in conjunction with a calcium anode. The details of construction and operation of such thermal batteries are well understood in the art and are, therefore, deemed unnecessary to set forth here. See, for example, Pat. No. 3,425,872 referenced above.

The invention takes account of the fact that in battery operation calcium cations are formed at the calcium anode with the liberation of free metallic lithium in accordance with the following reaction:

$$2Li^+ + Ca \underset{350°\ C.}{\xrightarrow{\Delta}} Ca^{++} + 2Li_{(l)} \qquad (3)$$

In order to prevent the formation of free molten lithium and the consequent production of calcium-lithium alloy by reaction (2) above, it is necessary to drive the equilibrium point in reaction (3) to the left. This result can be achieved by creating an additional source of calcium cations at the interface between the calcium anode and the lithium salt-containing electrolyte. Such a source of calcium cations is provided in an electrochemical cell having a calcium anode treated in accordance with this invention. As seen in the sketch, a typical bimetal anode 10 may be formed of a thin conductive base 11 provided with a substantially uniform coating 12 of calcium. Base 11 may consist of nickel or other metal to which reliable high temperature electrical connections can readily be made. Coating 12 may be applied by vapor deposition or other suitable means. A thin layer 14 of a calcium-containing compound to be described is formed on the surface of calcium coating 12 covering at least the interface between coating 12 and a fused electrolyte pellet 15. It is understood that pellet 15 is composed of a depolarizer, electrolyte, and binder formed under high pressure in a manner well known to the art. The electrolyte contains lithium chloride salt preferably in combination with potassium chloride salt in the ratio 45/55% by weight to establish the basic chemical constituents necessary for current conduction during battery operation. Typical depolarizers are calcium chromate and potassium chromate and the binder may conveniently be silicon dioxide. The surface of pellet 15 opposite anode 10 contacts a cathode 16 to complete the major cell elements. In order to provide a heat source for melting pellet 15, cathode 16 may conveniently be a mixture of iron and potassium perchlorate with the iron constituting the active portion of the cathode. Upon being energized (by means not shown) the potassium perchlorate furnishes necessary heat.

When the electrochemical cell is activated by melting of pellet 15, layer 14 dissolves at least slightly in the molten electrolyte, resulting in the formation of positive calcium cations at the interface between calcium coating 12 and pellet 15. This restricts the movement of reaction (3) in the righthand direction and therefore prevents formation of free molten lithium at the surface of coating 12.

For maximum effectiveness layer 14 is highly uniform and for the reason stated above, it must be soluble in the electrolyte. As will be appreciated from what follows, layer 14 should be as thin as possible consistent with accomplishment of the desired objective. Thicker layers tend to inhibit the generation of adequate electrical energy and also tend to delaminate and flake off. In addition, layer 14 must be at least slightly porous if it does not dissolve completely in the electrolyte in order that there will be the necessary contact between pellet 15 and calcium anode 10.

In order to produce the required protective layer 14 on anode 10, anode 10 may be immersed prior to cell assembly at about 27° C. in a solution of glacial acetic acid in a suitable solvent which is chemically inert with respect to acetic acid, calcium, and to the resulting calcium compound formed on anode 10. Of course both calcium and the newly formed calcium compound must be insoluble in this solvent. One solvent found to work well is acetone and the concentration of acetic acid is preferably varied from about 20 to 25 percent by volume with an immersion time variable from about 60 to 180 seconds. The resultant reaction is as follows:

$$3Ca + 8CH_3COOH \rightarrow [3Ca(CH_3COO)_2 \cdot 2CH_3COOH] + 3H_2 \qquad (4)$$

The bracketed expression on the righthand side of reaction (4) indicates the formation of a double salt of calcium acetate and acetic acid. This appears as layer 14 on calcium coating 12 of anode 10. Since the rate at which reaction (4) takes place is a function of the concentration of acetic acid, the immersion time must be controlled to obtain a satisfactory thickness of layer 14. The purpose of diluting the acetic acid is to slow down the calcium-acetic acid reaction. If the reaction occurs relatively slowly, the layer 14 tends to have better adherence. Very high acid concentrations shorten the allowable immersion time to a very few seconds, thus making layer thickness control and reproducibility difficult. Furthermore, high acid concentrations produce a turbulent reaction resulting in extremely porous layers because of the presence of gas byproducts.

After immersion, anode 10 is then dried at about 27° C. for a length of time sufficient to evaporate the excess acetone. At this point anode 10 may be assembled with its associated fused electrolyte and cathode in an electrochemical cell.

Alternatively, anode 10 may be heated at from 200° to 325° C. until the double salt has completely decomposed to calcium acetate, which then constitutes the material of layer 14. Anode 10 may then be assembled in an electrochemical cell. The decomposition reaction is as follows:

$$3Ca(CH_3COO)_2 \cdot 2CH_3COOH \xrightarrow[200°\ C.]{\Delta} 3Ca(CH_3COO)_2 + 2CH_3COOH \uparrow \qquad (5)$$

A second alternative involves continued heating of anode 10 prior to cell assembly within the range of 350° to 625° C. until the calcium acetate completely decomposes to calcium carbonate. This conversion reaction may be expressed as follows:

$$3Ca(CH_3COO)_2 \cdot 2CH_3COOH \xrightarrow[350°\ C.]{\Delta} 3CaCO_3 + 4CH_3COCH_3 \uparrow + H_2O \uparrow + CO_2 \uparrow \qquad (6)$$

The calcium carbonate appearing on the righthand side of reaction (6) again constitutes the material of layer 14 on anode 10. The successive decompositions of the double salt to calcium acetate and to calcium carbonate will occur automatically as a result of the heat of cell activation even if they are not induced separately prior to cell assembly.

The gaseous products of reaction (6) create pressures which may be undesirable particularly with lightweight thermal batteries which could be destroyed or deformed as a result. Consequently, prior heating of anode 10 to convert layer 14 to calcium carbonate may be advantageous in that it eliminates such gas products from the cell. Conversely, assembly of anode 10 within its electrochemical cell prior to the final heating step has the advantage that the double salt is more adherent than calcium carbonate and thus is less likely to be disturbed in assembly. The intermediate option of heating anode 10 until layer 14 consists of calcium acetate is a compromise between the relative merits of the other two options.

When the electrochemical cell is activated by application of sufficient heat to pellet 15, the electrolyte melts and the calcium carbonate of layer 14 ionizes, yielding calcium cations ($Ca^{++}$) and carbonate anions ($CO_3^{--}$) at the anode-electrolyte interface. The addition of calcium cations to the electrolyte from a source other than anode 10 achieves the desired result of moving the equilibrium point in reaction (3) to the left, thus preventing the displacement of free molten lithium and the consequent formation of lithium-calcium alloy.

Comparative tests have been conducted on electrochemical cells of the type described using both untreated calcium anodes and calcium anodes treated in accordance with the teachings of this invention. Table I presents data designed to illustrate the effects of anode treatment at a constant high current density of 1000 milliamps per square inch over a temperature range from $-65°$ F. to $+160°$ F. At each temperature a 5-cell battery with untreated anodes was tested in comparison to such a battery with treated anodes in which the initial immersion step involved from 20 to 25 volume percent concentration of acetic acid and immersion time varied from 60 to 180 seconds.

TABLE I

| Percent $CH_3COOH$/ Time (sec.) | I (ma./in.²) | Temp. (° F.) | Alloy (mg.) | Noise (No. batteries) | Life (sec. to 10.0 v.) |
|---|---|---|---|---|---|
| 0/0 | 1,000 | −65 | 27 | 2/10 | 75 |
| 20/180 | 1,000 |  | 0 | 0/2 | 61 |
| 25/60 | 1,000 |  | 0 | 0/8 | [1] 49 |
| 0/0 | 1,000 | −40 | 18 | 0/2 | 88 |
| 20/180 | 1,000 |  | 0 | 0/2 | 76 |
| 25/60 | 1,000 |  | 0 | 0/2 | 69 |
| 0/0 | 1,000 | 0 | 16 | 0/2 | 80 |
| 20/180 | 1,000 |  | 0 | 0/2 | 71 |
| 25/60 | 1,000 |  | 0 | 0/2 | 68 |
| 0/0 | 1,000 | +45 | 35 | 0/2 | 82 |
| 20/180 | 1,000 |  | 13 | 0/2 | 93 |
| 25/60 | 1,000 |  | 3 | 0/2 | 88 |
| 0/0 | 1,000 | +125 | 52 | 1/2 | 78 |
| 20/180 | 1,000 |  | 30 | 0/2 | 61 |
| 25/60 | 1,000 |  | 13 | 0/2 | 51 |
| 0/0 | 1,000 | +140 | 60 | 1/2 | 82 |
| 20/180 | 1,000 |  | 21 | 0/2 | 90 |
| 25/60 | 1,000 |  | 9 | 0/2 | 99 |
| 0/0 | 1,000 | +160 | 62 | 7/10 | [2] 87 |
| 20/180 | 1,000 |  | 29 | 2/2 | 85 |
| 25/60 | 1,000 |  | 13 | 0/8 | 60 |

[1] 2 had no life due to low voltage (not avg.).
[2] 3 had no life due to alloy shorting (not avg.).

In each test the amount of calcium-lithium alloy in milligrams was measured and the battery was given a life test with an assumed acceptable threshold output of 10 volts. If either intermittent noise or permanent shorting was present, the cell was reported as a complete failure.

Note that in every case the anode treatment either eliminates or substantially reduces the formation of alloy. Also, and more importantly perhaps, noise and cell shorting, which become a major problem at higher temperatures, i.e., 125° F. and above, are virtually eliminated. Finally, with few exceptions, there is no substantial degradation of battery life time to 10 volts.

Table II below sets forth 5-cell battery test data in which ambient temperature is held at −65° F. and current density is varied from a relatively high value of 1000 milliamps per square inch down to 100 milliamps per square inch. Anode immersion was constant at 25 percent acetic acid for 60 seconds.

TABLE II

| Percent $CH_3COOH$/ time (sec.) | I (ma./in.²) | Temp. (° F.) | Alloy (mg.) | Noise (No. batteries) | Life (sec. to 10.0 v.) |
|---|---|---|---|---|---|
| 0/0 | 1,000 | −65 | 25 | 0/2 | 82 |
| 25/60 |  | −65 | 0 | 0/2 | 56 |
| 0/0 | 950 | −65 | 25 | 0/2 | 91 |
| 25/60 |  | −65 | 0 | 0/2 | 72 |
| 0/0 | 900 | −65 | 48 | 0/2 | 90 |
| 25/60 |  | −65 | 3 | 0/2 | 82 |
| 0/0 | 750 | −65 | 32 | 0/2 | 168 |
| 25/60 |  | −65 | 0 | 0/2 | 140 |
| 0/0 | 342 | −65 | 18 | 0/2 | 303 |
| 25/60 |  | −65 | 0 | 0/2 | 231 |
| 0/0 | 100 | −65 | 16 | 0/2 | 419 |
| 25/60 |  | −65 | 0 | 0/2 | 406 |

Again it is observed that alloy formation in batteries with treated anodes is substantially nonexistent. At this low temperature, however, noise and shorting did not constitute a major problem even in the untreated cases. Only minimal degradation of battery life was observed due to anode treatment.

In Table III, the tests are similar to those of Table II with the exception that ambient temperature is raised to the high value of 160° F.

TABLE III

| Percent $CH_3COOH$/ time (sec.) | I (ma./in.²) | Temp. (° F.) | Alloy (mg.) | Noise (No. batteries) | Life (sec. to 10.0 v.) |
|---|---|---|---|---|---|
| 0/0 | 1,000 | +160 | 56 | 2/2 |  |
| 25/60 |  | +160 | 8 | 0/2 | 47 |
| 0/0 | 950 | +160 | 106 | 2/2 |  |
| 25/60 |  | +160 | 56 | 0/2 | 62 |
| 0/0 | 900 | +160 | 51 | 0/2 | 17 |
| 25/60 |  | +160 | 4 | 0/2 | 56 |
| 0/0 | 750 | +160 | 62 | 1/2 | 98 |
| 25/60 |  | +160 | 30 | 0/2 | 91 |
| 0/0 | 342 | +160 | 67 | 2/2 | 73 |
| 25/60 |  | +160 | 32 | 0/2 | 195 |
| 0/0 | 100 | +160 | 35 | 1/2 | 388 |
| 25/60 |  | +160 | 24 | 0/2 | 511 |

Again there is substantial reduction although not elimination of alloy due to anode treatment. What is perhaps more significant is that noiose and shorting, which represent a substantial problem in the untreated batteries, are eliminated in all treated batteries throughout the range from high to low load current values. Also, battery life is markedly enhanced by anode treatment.

The test data set forth in Tables I, II, and III was obtained using process option (a) above, in which cell activation provided the final heating step. Tests employing anodes prepared under options (b) and (c) above in which preheating to varying temperatures was used revealed no significant variance in end results.

A study of the various parameters involved in the tests described above lead to certain conclusions. With increased ambient temperature alloy formation increases, while with increased current density, alloy formation decreases. If the protective layer 14 on anode 10 is increased, alloy formation decreases but internal resistance increases and output voltage is correspondingly reduced. It is apparent that the optimum thickness of layer 14 must depend, therefore, upon a consideration of the particular operating conditions which a given thermal battery will be expected to meet. A typical electro-chemical cell in accordance with this invention would include an anode 10 having a base 11 with thickness of about .005 in., a calcium coating of from .055 to .010 in. and a layer 14 of calcium carbonate having a thickness from about .002 to .003 in.

Although the particular process described herein is limited to the formation of a layer of calcium acetate-acetic acid double salt, calcium acetate or calcium carbonate, other calcium-containing compounds may be formed on anode 10 as a source of calcium cations provided they meet the criteria stated above.

What is claimed is:

1. In an electrochemical cell the combination with a fused salt electrolyte containing lithium chloride of a calcium anode in contact with the electrolyte on which anode is formed an outer layer consisting of a calcium acetate-acetic acid double salt having the formula $$3Ca(CH_3COO)_2 \cdot 2CH_3COOH$$

said layer having a thickness sufficient to inhibit to a predetermined extent the formation of lithium-calcium alloy on said anode.

2. In an electrochemical cell the combination with a fused salt electrolyte containing lithium chloride of a calcium anode in contact with the electrolyte on which anode is formed an outer layer consisting of calcium acetate, said layer having a thickness sufficient to inhibit to a predetermined extent the formation of lithium-calcium alloy on said anode.

3. In an electrochemical cell the combination with a fused salt electrolyte containing lithium chloride of a calcium anode in contact with the electrolyte on which anode is formed an outer layer consisting of calcium carbonate, said layer having a thickness sufficient to inhibit to a predetermined extent the formation of lithium-calcium alloy on said anode.

References Cited

UNITED STATES PATENTS 3,470,027    9/1969    Nielsen _____ 136—83

WINSTON A. DOUGLAS, Primary Examiner

C. F. LE FEVOUR, Assistant Examiner

U.S. Cl. X.R.

136—120